Sept. 2, 1958     L. ROBINSON     2,850,138
SCALE FOR TYPEWRITING MACHINES
Filed Dec. 27, 1954
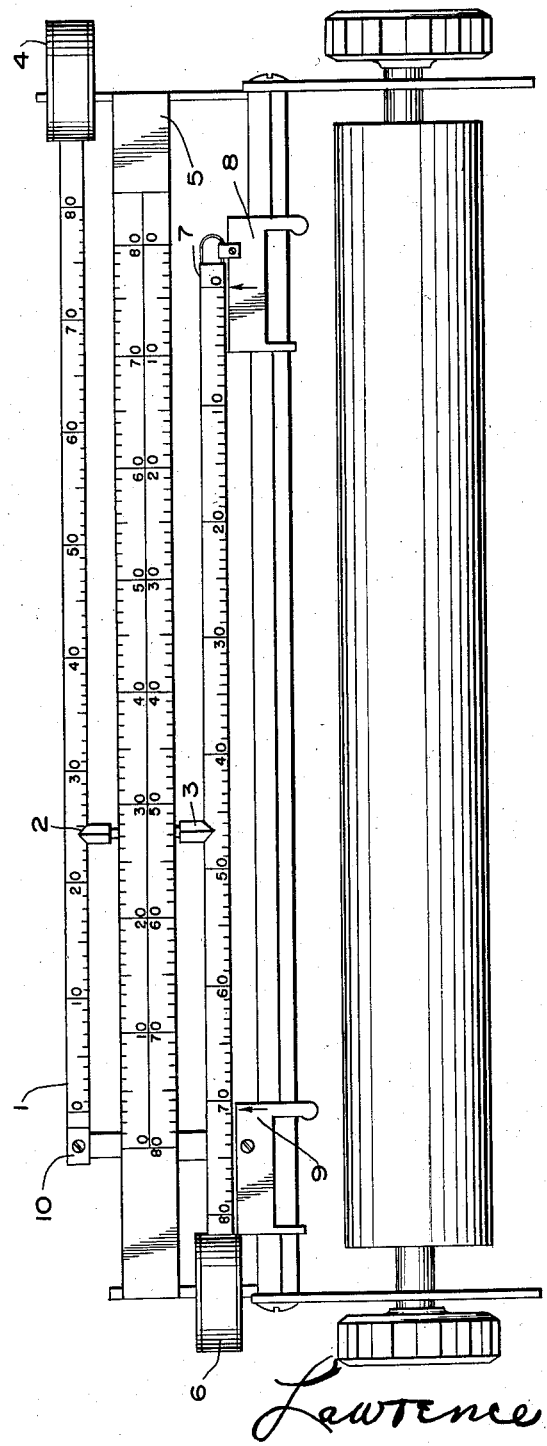
INVENTOR
Lawrence Robinson

United States Patent Office 2,850,138
Patented Sept. 2, 1958

2,850,138

SCALE FOR TYPEWRITING MACHINES

Lawrence Robinson, Walla Walla, Wash.

Application December 27, 1954, Serial No. 477,700

12 Claims. (Cl. 197—194)

This is a line-measuring scale for use on typewriting machines which have means for varying their line length. Typewriters used for ordinary correspondence are equipped with fixed scales on the carriage or frame, which are intended to remain in one position. Fixed scales do not permit their starting or terminal points to be opposite the printing-point indicator at the beginning or end of the line being typed, except when the margin-stops are set for the limit of carriage movement in their direction. This is seldom the case, therefore it is necessary to subtract the number of spaces the margin-stops are from the ends of the scales to obtain the correct number of spaces between margins, or the distance of any character on the line from either margin. It distracts the attention of the typist and this device is intended to eliminate it by permitting the answers to be read from the scales directly opposite the indicators. It will also allow tabulator-stops to be set on a rack or their positions read without calculation. Scales numbered alternately show the space center between margins and aid in centering headlines.

Typewriters usually have a double scale on a single rule, beginning at opposite ends with a zero and finishing with the scale-length number, which would allow longitudinal adjustment in one direction only, and two individual scales on separate bases are proposed to allow adjustment in both directions. These scales can be used as a substitute for or in combination with any typewriter scale.

An object of this invention is to provide a typewriter scale whose zero or beginning end can be placed directly opposite a printing-point or its index on an adjacent section of the machine at any position of the printing-point along the platen, without projecting longitudinally beyond the part on which it is mounted.

Another object of this device is to allow the scales to be set automatically with margin-stops or adjustable margin-indicators.

The primary aim of this invention is to permit the position of the printing-point from either margin to be measured from the zero-marks on the scales.

Figure 1 in the accompanying drawing, viewed from in front and above, illustrates the above mentioned facts, numbers 2 and 3 being fixed printing-point indicators at the center of the typewriter frame. Number 5 is a fixed scale such as is used on most typewriters. Two indicators are shown where but one would be necessary if the flexible scales were adjacent.

Numbers 1 and 7 are the zero points indicating the left-hand and right-hand margins, respectively, with 9 the beginning margin-stop and 8 the end margin-stop. Number 4 is the tape roll enclosed in a case fixed to the carriage, controlled by the left-hand margin-stop 9, and 6 the case of the tape mounted on the other end of the carriage, which is controlled by the right-hand margin-stop 8 and attached at the beginning of the scale to a hook by means of a set-screw.

Number 10 is an arm extending horizontally at right angles from the left-hand margin-stop 9 beneath scales 6 and 5, attached by a set-screw to the beginning of scale 4. In the drawing submitted indicator 2 is opposite graduation mark 24 on scale 4, showing that the carriage has moved 24 spaces from the left margin of the line, and indicator 3 points to 47 on scale 6 attached to the margin-stop regulating the end of the line, showing the distance of the printing-point from the end margin. These two numbers added amount to 71 spaces, the total line length between margins, as shown on scale number 6 or on scale number 4 if the two were adjacent or an extension indicator at right angles from margin-stop 8 were used (not shown).

Variations may be resorted to within the scope of the invention, and portions of the improvements may be used without others.

I claim:

1. In a typewriting machine, the combination with two scale-bearing devices, of two shiftable margin-stops and means connecting each scale-bearing device to a separate margin-stop, so that the zero point of a scale is always at a margin-stop.

2. In a typewriting machine, the combination with shiftable margin-stops and a carriage traveling between said margin-stops, of two scale-bearing devices, each connected to one of said stops and adjustable therewith, and a pointer on each stop and on the machine to indicate on the scales the position of the stops and the carriage.

3. The combination with a typewriter carriage and frame, of shiftable margin-stops, two flexible scale-strips, each attached to a stop, means to keep the scale-strips taut, and a pointer on the machine indicating on the scales the position of the carriage.

4. In a typewriter, the combination of adjustable margin-stops, a carriage limited in its travel in opposite directions by said stops, two scale-bearing devices, pointers to indicate on the scales the positions of the carriage and margin-stops, and means whereby the adjustment of said stops and scale-bearing devices serves to indicate the number of letter-spaces between said stops on either scale.

5. The combination with a typewriter frame and carriage, of two scales adjustable endwise independently, and margin-gauges, one connected to each scale for adjustment therewith, one gauge for the line-beginning and the other for the line-ending.

6. The combination with a typewriter carriage and frame having a carriage index, of two movable scales therefor, the range of movement of said scales from their normal positions, in which they register the full carriage movement, being in the direction of the ascending notation thereon, to vary the length of the scale-indicated line of writing for said carriage, and a gauge movable with each of said scales relative to the opposite scale.

7. In a typewriting machine, the combination with a carriage and margin-gauge mechanism therefor, inclusive of an adjustable carriage-stop to control the left-hand margin on a work-sheet and a second adjustable stop to control the right-hand margin on the work-sheet, of a scale-bearing device attached to the first-named stop and another scale-bearing device attached to the last-named stop, both having graduations arranged to read directly the number of letter-spaces between stops, to indicate the length of writing-line bounded by said stops.

8. The combination with a carriage and an index, of an endwise adjustable scale-bearing device, and a gauge to determine the beginning of a line, said gauge connected to and adjustable with said device, whereby the width of the left-hand margin is controlled by the operator, and lines of all lengths begin at zero on the scale, and another adjustable scale-bearing device, and a gauge to determine the end of a line, said gauge connected to and adjustable with said device, whereby the width of the right-hand margin is controlled by the operator, and the limit for all line lengths is zero on the last-named scale.

9. In a typewriting machine having a letter-feeding carriage, the combination of a carriage-index and two separate scale-bearing devices with scales therefor, and margin-gauge mechanism including a stop connected to each scale-bearing device for adjustment therewith to position said scales endwise, said margin stops variably and mechanically limiting the carriage movement, one of the scales always presenting its "0" or initial notation to said index at the beginning of lines of all lengths determined by the adjustment of one of said stops; and the other scale always presenting its "0" or initial notation to carriage-index at the end limit for all line-lengths determined by the adjustment of said other stop.

10. In a typewriter, the combination of a shiftable margin-gauge; a flexible scale strip attached at one end to said gauge to be shifted endwise thereby; another shiftable margin-gauge with a flexible scale strip attached at one end to be shifted endwise thereby; and two spring-drums each connected to the other ends of said scale strips, to keep the latter taut and wind up the scale-strip of a gauge when it is shifted toward the other gauge.

11. In a typewriter, the combination of a frame and carriage with margin-gauge mechanism therefor having flexible scales for line-measurement, each scale attached at its zero end to a margin-stop and at its opposite end to a spiral spring around which it automatically winds and unwinds while being adjusted, cases for enclosing each combined spring and scale, each case having means for attachment to the machine and a slot in its side through which the scale moves when being adjusted.

12. In a typewriter, the combination of a frame and carriage with line-scales, two fixed and two adjustable, parallel to the carriage movement and margin-stops-with-indexes attached to the beginning of each adjustable scale; the said indexes indicating directly on the fixed scales the exact number of spaces of the margins at each end from the line-length limit of the typewriter.

References Cited in the file of this patent

UNITED STATES PATENTS

| | | |
|---|---|---|
| 1,140,330 | Merlin | May 18, 1915 |
| 1,153,252 | Pritzl | Sept. 14, 1915 |